US012753695B2

(12) United States Patent
Rodriguez Erdmenger et al.

(10) Patent No.: US 12,753,695 B2
(45) Date of Patent: Oct. 6, 2026

(54) AIRFOILS FOR GAS TURBINE ENGINES

(71) Applicants: General Electric Company, Evendale, OH (US); General Electric Deutschland Holding GmbH, Frankfurt (DE)

(72) Inventors: Rodrigo Rodriguez Erdmenger, Munich (DE); Rudolf K. Selmeier, Fahrenzhausen (DE); Paolo Vanacore, Munich (DE); Michael Macrorie, Winchester, MA (US); David V. Parker, Middleton, MA (US)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 45 days.

(21) Appl. No.: 19/286,515

(22) Filed: Jul. 31, 2025

(65) Prior Publication Data

US 2026/0251064 A1 Aug. 27, 2026

Related U.S. Application Data

(60) Provisional application No. 63/763,657, filed on Feb. 26, 2025.

(51) Int. Cl.
*F01D 5/14* (2006.01)

(52) U.S. Cl.
CPC ........ *F01D 5/141* (2013.01); *F05D 2240/301* (2013.01); *F05D 2240/303* (2013.01);
(Continued)

(58) Field of Classification Search
CPC ............... F01D 5/141; F05D 2240/301; F05D 2240/307
See application file for complete search history.

(56) References Cited

U.S. PATENT DOCUMENTS

| | | | | |
|---|---|---|---|---|
| 9,506,347 | B2 * | 11/2016 | Key | F01D 5/141 |
| 10,316,671 | B2 | 6/2019 | Chakka et al. | |

(Continued)

FOREIGN PATENT DOCUMENTS

| | | | |
|---|---|---|---|
| CN | 103136422 | A | 6/2013 |
| CN | 107145677 | A | 9/2017 |

(Continued)

*Primary Examiner* — Michael L Sehn
(74) *Attorney, Agent, or Firm* — Dority & Manning, P.A.

(57) ABSTRACT

A gas turbine engine includes a turbomachine having a compressor section, a combustion section, and a turbine section arranged in serial flow order along a centerline axis. The compressor section includes a plurality of airfoils. Each of the plurality of airfoils includes a leading edge, a trailing edge opposite the leading edge, a first sidewall extending between the leading edge and the trailing edge, a second sidewall extending between the leading edge and the trailing edge opposite the first sidewall, an airfoil root, and an airfoil tip opposite the airfoil root. Each of the plurality of airfoils defines a span height between the airfoil root and the airfoil tip, a leading edge thickness between the first sidewall and the second sidewall, an airfoil length extending between the leading edge and the trailing edge, a maximum thickness between the first sidewall and the second sidewall, and an airfoil thickness parameter.

15 Claims, 4 Drawing Sheets

(52) U.S. Cl.
CPC .. *F05D 2240/304* (2013.01); *F05D 2240/307* (2013.01); *F05D 2300/133* (2013.01)

(56) References Cited

U.S. PATENT DOCUMENTS

| | | | | |
|---|---|---|---|---|
| 10,473,112 | B2 * | 11/2019 | Smith | F01D 5/26 |
| 10,954,799 | B2 | 3/2021 | Chakka et al. | |
| 11,952,912 | B2 | 4/2024 | Vandeputte et al. | |

FOREIGN PATENT DOCUMENTS

| | | | |
|---|---|---|---|
| CN | 111950083 | A | 11/2020 |
| CN | 113094840 | A | 7/2021 |
| CN | 115929690 | A | 4/2023 |

* cited by examiner

AIRFOILS FOR GAS TURBINE ENGINES

CROSS-REFERENCE TO RELATED APPLICATIONS

This application is a non-provisional application claiming the benefit of priority under 35 U.S.C. § 119 (e) to U.S. Provisional Application No. 63/763,657, filed Feb. 26, 2025, which is hereby incorporated by reference in its entirety.

FIELD

The present disclosure relates to gas turbine engines, and more particularly to airfoils for gas turbine engines.

BACKGROUND

A gas turbine engine includes a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to, e.g., propel an aircraft in flight. The turbomachine is mechanically coupled to an output shaft to, in the case of a turboprop engine, drive a propeller section of the gas turbine engine during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
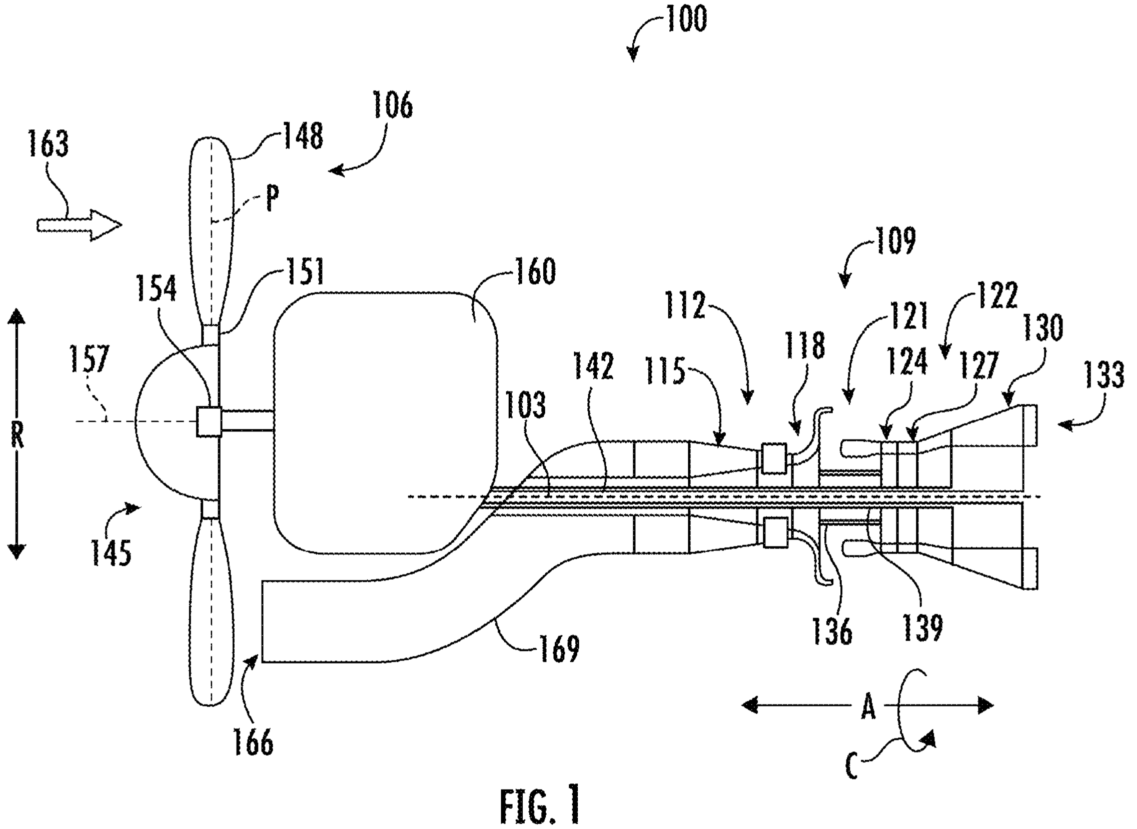
FIG. 1 is a schematic view of a turboprop engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, open rotor gas turbine engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high," or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the term "adjacent" when used to identify a component of a plurality of the same or similar components relative to a base component, refers to a component of the plurality of components positioned next to the base component with no intervening components of the plurality of components positioned therebetween. Moreover, "adjacent" may refer to a component or a measurement made near a base component. For example, the component or measurement may be within a specified distance from the base component.

The term "redline speed" refers to a maximum rotational speed of a gas turbine engine permitted at takeoff as documented in the FAA-type certificate data sheet. For example, the redline speed is the rate at which the drive shaft for the gas turbine engine rotates, which defines the rotational speed of the particular airfoil within the gas turbine engine.

Generally, a gas turbine engine includes a fan and a turbomachine, with the turbomachine rotating the fan to generate thrust. The turbomachine includes a compressor section, a combustion section, a turbine section, and an exhaust section and defines a working gas flowpath therethrough. The compressor section includes a plurality of airfoils for directing the flow of combustion gases therethrough. Traditionally, a thickness of the plurality of airfoils is reduced to improve aerodynamic efficiency and reduce weight, particularly towards a leading edge of each airfoil of the plurality of airfoils. However, it has been found that an ability of the plurality of airfoils to resist damage due to foreign object impact is reduced with such reduction in thickness at the leading edge.

The inventors of the present disclosure sought out a means to protect the plurality of airfoils from foreign object damage without the plurality of airfoils having a thickness that creates blockages and aerodynamic issues. More specifically, the inventors developed an airfoil design for the plurality of airfoils that provide foreign object damage protection without unnecessarily increasing weight and without undesirably reducing aerodynamic efficiency. The inventors discovered in the course of designing the plurality of airfoils in such a manner that the aerodynamic cost and weight penalty associated with certain increased thicknesses at the leading is overcome by durability and robustness benefits in at least certain designs, contrary to previous thinking and expectations.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a turboprop engine 100. As shown in FIG. 1, turboprop engine 100 defines an axial direction A (extending parallel to a longitudinal centerline or central axis 103 provided for reference), a radial direction R, and a circumferential direction C disposed about the axial direction A. Turboprop engine 100 generally includes a propeller section 106 and a turbomachine 109 disposed aft of the propeller section 106. The propeller section 106 is operable with, and driven by, turbomachine 109.

The turbomachine 109 includes, in a serial flow relationship, a compressor section 112 having a high pressure (HP) compressor 118, a combustion section 121, a turbine section 122, and an exhaust section 133. In at least one example embodiment, the turbine section 122 includes a high pressure (HP) turbine 124 and a low pressure (LP) turbine 130. Additionally, the turbine section 122 may include an intermediate pressure (IP) turbine 127 between the HP turbine 124 and the LP turbine 130 in some embodiments. An air flow path generally extends through the compressor section 112, the combustion section 121, the turbine section 122, and the exhaust section 133, which are in fluid communication with each other.

In at least certain exemplary embodiments, the HP turbine 124 can include at least two stages of HP turbine rotor blades. Such a configuration may ensure a sufficient amount of power is provided to the HP compressor 118.

In at least one example embodiment, the compressor section 112 includes a booster compressor 115. In such embodiments, the air flow path generally extends through the booster compressor 115, the HP compressor 118, the combustion section 121, the turbine section 122, and the exhaust section 133, which are in fluid communication with each other. Moreover, an IP shaft 139 drivingly connects the IP turbine 127 to the booster compressor 115.

An HP shaft or spool 136 drivingly connects the HP turbine 124 to the HP compressor 118. An LP shaft or spool 142 drivingly connects the LP turbine 130 to propeller section 106 of the turboprop engine 100. The turbomachine 109 includes a drive turbine drivingly coupled to a drive turbine shaft configured to provide an output torque to, e.g., the propeller section 106 in the embodiment shown. For the embodiment depicted, the drive turbine is the LP turbine 130 and the drive turbine shaft is the LP shaft 142.

As shown in FIG. 1, the propeller section 106 includes a variable pitch propeller 145 having a plurality of propeller blades 148 coupled to a disk 151 in a spaced apart manner. As depicted, the propeller blades 148 extend outwardly from disk 151 generally along the radial direction R. Each propeller blade 148 is rotatable relative to the disk 151 about a pitch axis P by virtue of the propeller blades 148 being operatively coupled to a suitable actuation member 154 configured to collectively vary the pitch of the propeller blades 148, e.g., in unison. The propeller blades 148, the disk 151, and the actuation member 154 are together rotatable about a fan centerline 157 by LP shaft 142 across a power gear box 160. The power gear box 160 includes a plurality of gears for stepping down the rotational speed of the LP shaft 142 to a more efficient rotational fan speed and is attached to one or both of a core frame or a fan frame through one or more coupling systems. Additionally, for the embodiment shown, the power gear box 160 is an offset gear box, such that the fan centerline 157 is offset from the central axis 103 of the turbomachine 109.

During operation of the turboprop engine 100, a volume of air 163 (also referred to as a free stream flow of air prior to its encounter with the propeller 145) passes through the propeller blades 148 of propeller 145. A portion of the air 163 is urged toward an inlet 166 of turbomachine 109. More specifically, turboprop engine 100 includes an intake channel 169 that extends from the inlet 166 to the booster compressor 115.

The booster compressor 115 and the HP compressor 118 each include one or more sequential stages of compressor stator vanes, one or more sequential stages of compressor rotor blades, an impeller, or combinations thereof. In particular, the booster compressor 115 is depicted as an axial compressor (having multiple stages of compressor stator vanes and rotor blades) and the HP compressor 118 is depicted as a centrifugal compressor (having an impeller).

Though the illustrated embodiment includes both axial and centrifugal flow compressors, in some forms the turboprop engine 100 can include just an axial flow compressor(s) or centrifugal flow compressor(s).

The HP compressor 118 directs compressed air into combustion section 121 where the air mixes with fuel. Combustion section 121 includes a combustor which combusts the air/fuel mixture to provide combustion gases. The combustion gases flow through the HP turbine 124, the IP turbine 127, and the LP turbine 130. Each of these HP, IP, and LP turbines 124, 127, 130 includes one or more sequential stages of turbine stator vanes and one or more sequential stages of turbine rotor blades. The turbine rotor blades are coupled to a respective one of the HP shaft 136, the IP shaft 139, or the LP shaft 142 to extract thermal and/or kinetic energy from the combustion gasses flowing therethrough. The energy extraction from the HP turbine 124 supports operation of the HP compressor 118 through the HP shaft 136, the energy extraction from the IP turbine 127 supports operation of the booster compressor 115 through the IP shaft 139, and the energy extraction from the LP turbine 130 supports operation of propeller section 106 through LP shaft 142 (across the power gear box 160). Combustion gases exit the turboprop engine 100 through exhaust section 133.

In other exemplary embodiments, the turbine engine may include any suitable number of compressors, turbines, shafts, etc. For example, as will be appreciated, the HP shaft 136 and the LP shaft 142 may further be coupled to any suitable device for any suitable purpose. For example, in certain exemplary embodiments, the turboprop engine 100 of FIG. 1 may be utilized in aeroderivative applications. Additionally, in other exemplary embodiments, turboprop engine 100 may include any other suitable type of combustor, such as a reverse flow combustor.

The turboprop engine 100 depicted in FIG. 1 is by way of example only. In other exemplary embodiments, the turboprop engine 100 may have any other suitable configuration. For example, aspects of the present disclosure may be incorporated into any other suitable gas turbine engine, such as, for example, turbofan engines, open rotor engines, propfan engines, turboshaft engines, ground power generation machines, or a combination thereof.

Figure 2:
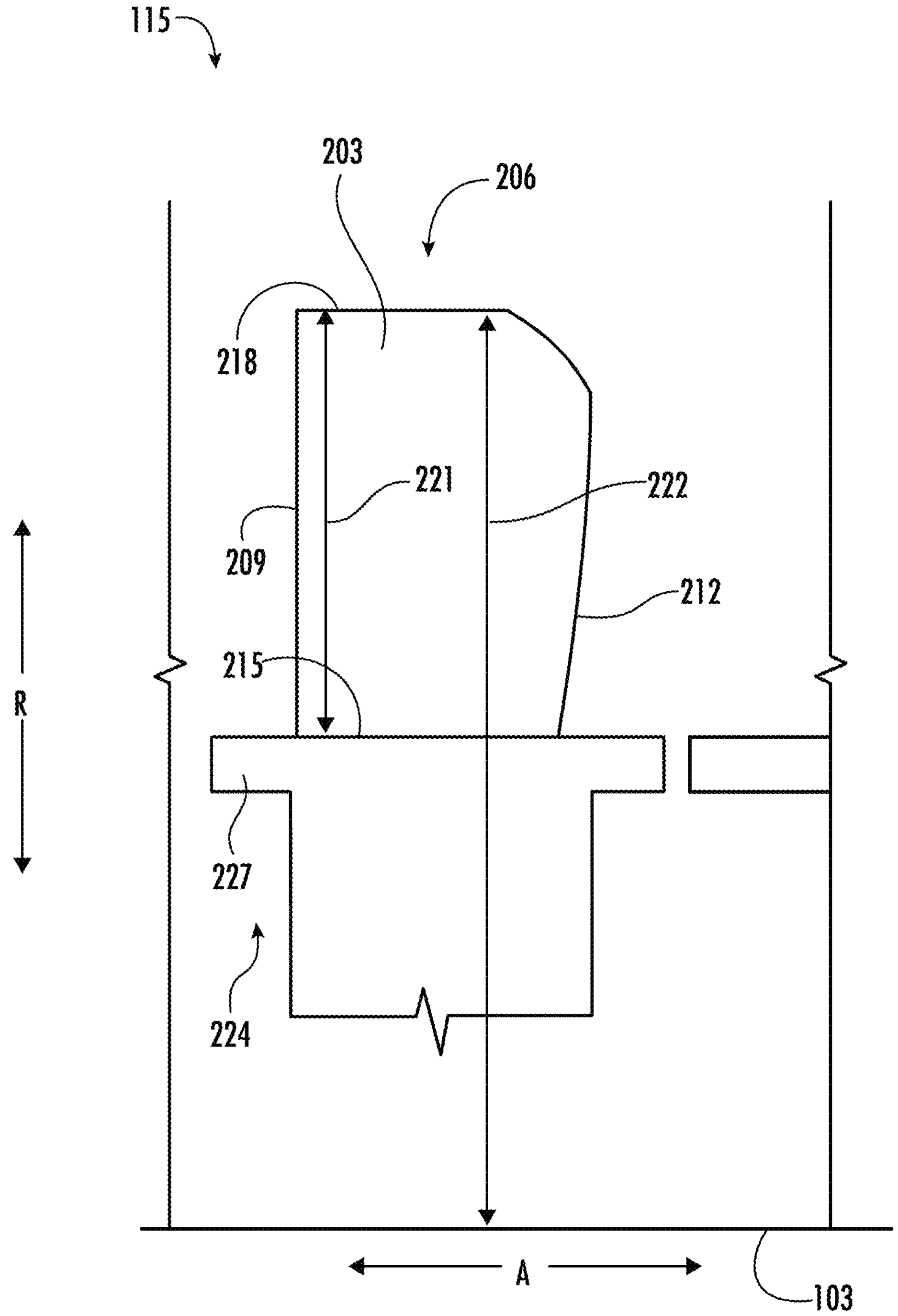
FIG. 2 is a detailed view of an airfoil of a plurality of airfoils of a compressor section of the turboprop engine of FIG. 1 in accordance with an exemplary aspect of the present disclosure.
Figure 3:
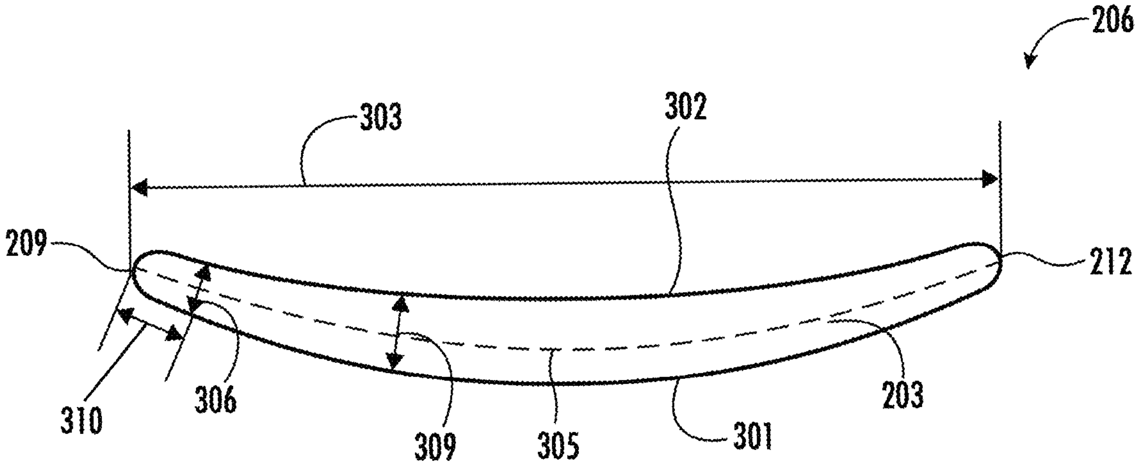
FIG. 3 is a cross-sectional view of the airfoil of FIG. 2 in accordance with an exemplary aspect of the present disclosure.

FIG. 2 is a detailed view of an airfoil 203 of a plurality of airfoils 206 of the compressor section 112 of the turboprop engine 100 of FIG. 1 in accordance with an exemplary aspect of the present disclosure. FIG. 3 is a cross-sectional view of the airfoil 203 of FIG. 2 in accordance with an exemplary aspect of the present disclosure. More particularly, the plurality of airfoils 206 may be incorporated into the compressor section 112 as the one or more sequential stages of compressor rotor blades. For example, the plurality of airfoils 206 may include one or more sequential stages of rotor blades of the booster compressor 115, the HP compressor 118, or both the booster compressor 115 and the HP compressor 118.

In at least one example embodiment, the plurality of airfoils 206 may be formed of titanium. Additionally, or alternatively, the plurality of airfoils 206 may be formed of steel Inconel, A286, or a combination thereof.

Each airfoil 203 of the plurality of airfoils 206 includes a leading edge 209 and a trailing edge 212 opposite the leading edge 209. The airfoil 203 extends in the radial direction R from an airfoil root 215 to an airfoil tip 218. The airfoil 203 defines a span 221 extending in the radial direction R from the airfoil root 215 to the airfoil tip 218. Moreover, the airfoil 203 defines an airfoil radius 222, which is a distance in the radial direction R between the central axis 103 and the airfoil tip 218. The airfoil radius 222 is measured at the leading edge 209 of each airfoil 203. The compressor section 112, including one or both of the booster compressor 115 and the HP compressor 118, includes a rotor 224 having a base 227. The airfoil root 215 is coupled to the base 227 of the rotor 224.

With reference to FIG. 3, each airfoil 203 of the plurality of airfoils 206 includes a first sidewall 301 extending between the leading edge 209 and the trailing edge 212 and a second sidewall 302 extending between the leading edge 209 and the trailing edge 212 opposite the first sidewall 301. The airfoil 203 defines an airfoil length 303 extending between the leading edge 209 and the trailing edge 212. The airfoil length 303 extends parallel to the axial direction A, such as parallel to the central axis 103 (FIG. 1). Moreover, the airfoil length 303 is measured at the airfoil tip 218, such as at 100% of the span 221. For example, the airfoil root 215 defines 0% of the span 221 and the airfoil tip 218 defines 100% of the span 221. A ratio of the airfoil length 303 divided by the airfoil radius 222 is greater than or equal to 0.170 and less than or equal to 0.452.

The airfoil 203 defines a mean camber line 305 extending between the leading edge 209 and the trailing edge 212 at a location midway between the first sidewall 301 and the second sidewall 302. The airfoil 203 also defines a leading edge thickness 306 measured between the first sidewall 301 and the second sidewall 302 adjacent the leading edge 209. The leading edge thickness 306 is measured in a direction that is perpendicular to the mean camber line 305 at the leading edge 209. The leading edge thickness 306 is measured at a distance 310 equal to 0.04 inches from the leading edge 209 along the mean camber line 305. Moreover, a ratio of the leading edge thickness 306 divided by the airfoil radius 222 is greater than or equal to 0.002 and less than or equal to 0.006.

Additionally, the airfoil 203 defines a maximum thickness 309 extending between the first sidewall 301 and the second sidewall 302. The maximum thickness 309 is a maximum thickness of the airfoil 203 at any location between the leading edge 209 and the trailing edge 212. Moreover, the maximum thickness 309 is measured in a direction that is perpendicular to the mean camber line 305. A ratio of the maximum thickness 309 divided by the airfoil radius 222 is greater than or equal to 0.006 and less than or equal to 0.012.

The leading edge thickness 306 and the maximum thickness 309 are measured at the airfoil tip 218. The airfoil root 215 defines 0% of the span 221 and the airfoil tip 218 defines 100% of the span 221. The leading edge thickness 306 is measured at the distance 310, which is equal to 0.04 inches from the leading edge 209, along the mean camber line 305 at 100% of the span 221, and the maximum thickness 309 is measured at 100% of the span 221 at a position at or between the leading edge 209 and the trailing edge 210 along the mean camber line 305. It should also be understood that a length of the span 221 at the leading edge 209 may be greater than a length of the span 221 at the trailing edge 210 in some example embodiments. For example, the length of the span 221 may decrease from the leading edge 209 towards the trailing edge 210. Alternatively, the span 221 may decrease from the trailing edge 210 towards the leading edge.

As alluded to earlier, the inventors developed an airfoil design for a plurality of airfoils of a gas turbine engine with improved protection against foreign object damage. In particular, the inventors determined that a span height H (the span 221), a leading edge thickness $T_L$ (the leading edge thickness 306), an airfoil length $L_{airfoil}$ (the airfoil length 303), and a maximum thickness $T_{max}$ (the maximum thickness 309) relative to an airfoil radius R (the airfoil radius 222) of each of the plurality of airfoils have an effect on durability and robustness.

As stated above, the inventors created solutions with relatively high airfoil durability and robustness (e.g., increased protection against erosion and foreign object damage, including damage from bird strikes and from particles such as ice and water) for a defined engine environment.

The span height H, the leading edge thickness $T_L$, the airfoil length $L_{airfoil}$, and maximum thickness $T_{max}$ can be used with the tip speed $U_{tip}$ to balance a size and thickness of each of the plurality of airfoils for preventing foreign object damage without detrimentally increasing weight and reducing aerodynamic performance.

Table 1 below illustrates 12 examples (denoted Ex. 1-12) of the airfoil 203 developed by the inventors. Table 1 includes values for the ratio of the span height H divided by the airfoil radius R, the ratio of the leading edge thickness $T_L$ divided by the airfoil radius R, the ratio of the airfoil length $L_{airfoil}$ divided by the airfoil radius R, and maximum thickness $T_{max}$ divided by the airfoil radius R along with values for the tip speed $U_{tip}$.

TABLE 1

| | Parameter | | | | |
|---|---|---|---|---|---|
| Units | H/R (Span Height/ Airfoil Radius) [—] | $T_L$/R (Leading Edge Thickness/ Airfoil Radius) [—] | $L_{airfoil}$/R (Airfoil Length/ Airfoil Radius) [—] | $T_{max}$/R (Maximum Thickness/ Airfoil Radius) [—] | $U_{tip}$ (Tip Speed) ft/sec |
| Ex. 1 | 0.624 | 0.005 | 0.412 | 0.012 | 1420 |
| Ex. 2 | 0.302 | 0.003 | 0.272 | 0.009 | 1273 |
| Ex. 3 | 0.246 | 0.002 | 0.189 | 0.006 | 1313 |
| Ex. 4 | 0.182 | 0.003 | 0.170 | 0.009 | 1267 |
| Ex. 5 | 0.624 | 0.005 | 0.412 | 0.012 | 1420 |
| Ex. 6 | 0.302 | 0.004 | 0.252 | 0.007 | 1273 |
| Ex. 7 | 0.246 | 0.005 | 0.199 | 0.006 | 1313 |
| Ex. 8 | 0.182 | 0.003 | 0.175 | 0.008 | 1267 |
| Ex. 9 | 0.624 | 0.006 | 0.452 | 0.012 | 1421 |
| Ex. 10 | 0.355 | 0.004 | 0.276 | 0.009 | 1378 |
| Ex. 11 | 0.241 | 0.005 | 0.188 | 0.007 | 1348 |
| Ex. 12 | 0.178 | 0.004 | 0.174 | 0.008 | 1309 |

The inventors found that the airfoil designs with parameters defined in Examples 1-12 of Table 1 exhibit relatively high structural integrity, durability, and robustness while remaining within current engine constraints.

The examples shown in Table 1 can be characterized by an airfoil thickness parameter (ATP) that can be used to distinguish those designs in Examples 1-12 that meet the performance (durability and robustness) requirements from designs that do not meet the performance requirements. As such, the airfoil thickness parameter (ATP) can be used to identify an improved airfoil design, better suited for a particular engine operating environment and taking into account the constraints imposed on airfoil design used in such a system.

Generally, the airfoil thickness parameter (ATP) is a dimensionless quantity relating the span height H, the leading edge thickness $T_L$, the airfoil length $L_{airfoil}$, and the maximum thickness $T_{max}$ of the airfoil 203. The airfoil thickness parameter (ATP) is defined as follows:

$$\frac{H/R * T_L/R}{L_{airfoil}/R * T_{max}/R} = \frac{H * T_L}{L_{airfoil} * T_{max}} \quad (1)$$

The span height H is the span 221 extending from the airfoil root 215 to the airfoil tip 218 of the airfoil 203. The span height H is measured at the leading edge 209 of the airfoil 203. The span height H is a geometric measurement measured in feet. A ratio of the span height H divided by an airfoil radius R, such as the airfoil radius 222, is greater than or equal to 0.178 and less than or equal to 0.624.

The leading edge thickness $T_L$ is the leading edge thickness 306 measured between the first sidewall 301 and the second sidewall 302 adjacent the leading edge 209. For example, leading edge thickness $T_L$ is measured 0.040 inches from the leading edge 209. Moreover, the leading edge thickness $T_L$ is measured at the airfoil tip 218, or at 100% of the span 221, of the airfoil 203. Additionally, the leading edge thickness $T_L$ is a geometric measurement measured in feet. A ratio of the leading edge thickness $T_L$ divided by the airfoil radius 222 is greater than or equal to 0.002 and less than or equal to 0.006.

The airfoil length $L_{airfoil}$ is the airfoil length 303 extending between the leading edge 209 and the trailing edge 212 of the airfoil 203. For example, the airfoil length $L_{airfoil}$ extends between the leading edge 209 and the trailing edge 212 parallel to the axial direction A and the central axis 103. Additionally, the airfoil length $L_{airfoil}$ is a geometric measurement measured in feet. A ratio of the airfoil length $L_{airfoil}$ divided by the airfoil radius 222 is greater than or equal to 0.170 and less than or equal to 0.452.

The maximum thickness $T_{max}$ is the maximum thickness 309 extending between the first sidewall 301 and the second sidewall 302 of the airfoil 203. The maximum thickness $T_{max}$ is measured at the airfoil tip 218, or at 100% of the span 221, of the airfoil 203. Additionally, the maximum thickness $T_{max}$ is a geometric measurement measured in feet. A ratio of the maximum thickness $T_{max}$ divided by the airfoil radius 222 is greater than or equal to 0.006 and less than or equal to 0.012.

A lower bound and an upper bound for the airfoil thickness parameter (ATP) are determined using a beta distribution. A beta distribution is a family of continuous probability distributions defined on the interval [0, 1] parameterized by two positive shape parameters, denoted by a and B, that appear as exponents of the random variable and control the shape of the distribution. The beta distribution is defined as follows:

$$f(x;\alpha,\beta)=\frac{1}{B(\alpha,\beta)}x^{\alpha-1}(1-x)^{\beta-1} \quad (2)$$

The lower bound and the upper bound for the airfoil thickness parameter (ATP) defined by the beta distribution are based on a ratio x, a first constant α, and a second constant β. The ratio x is based on a tip speed $U_{tip}$ of the airfoil 203. The lower bound for the airfoil thickness parameter (ATP) is defined as follows:

$$0.79*\text{Beta Distribution}\left(x=\frac{U_{tip}-910}{890};\alpha=1.9,\ \beta=2.4\right) \quad (3)$$

Accordingly, based on (2) and (3), the lower bound for the airfoil thickness parameter (ATP) is re-written as follows:

$$0.79*\left[\frac{1}{B(1.9,2.4)}\left(\frac{U_{tip}-910}{890}\right)^{0.9}\left(1-\left(\frac{U_{tip}-910}{890}\right)\right)^{1.4}\right] \quad (4)$$

The upper bound for the airfoil thickness parameter (ATP) is defined as follows:

$$1.4*\text{Beta Distribution}\left(x=\frac{U_{tip}-1035}{765};\alpha=18.5,\ \beta=43.5\right) \quad (5)$$

Accordingly, based on (2) and (5), the upper bound for the airfoil thickness parameter (ATP) is re-written as follows:

$$1.4*\left[\frac{1}{B(18.5,43.5)}\left(\frac{U_{tip}-1035}{765}\right)^{17.5}\left(1-\left(\frac{U_{tip}-1035}{765}\right)\right)^{42.5}\right] \quad (6)$$

The tip speed $U_{tip}$ of (3)-(6) relates a rotational speed 22 of the airfoil 203 and an airfoil radius R. The airfoil radius R is the airfoil radius 222 measured at the leading edge 209, as described with respect to FIG. 2. The rotational speed 22 is measured in radians per second and the airfoil radius R is measured in feet. Accordingly, the tip speed $U_{tip}$ is measured in feet per second. The tip speed $U_{tip}$ is defined as follows:

$$U_{tip}=\Omega\times R \quad (7)$$

The tip speed $U_{tip}$ and the rotational speed 22 are measured when the gas turbine engine 10 is operating at a redline speed. The tip speed $U_{tip}$ is greater than 1,200 feet per second and less than 1,800 feet per second. More specifically, the tip speed $U_{tip}$ may be greater than or equal to 1,267 feet per second and less than or equal to 1,421 feet per second.

Values for the airfoil thickness parameter (ATP) for each of the examples of Table 1 are shown below in Table 2.

TABLE 2

| Parameter Units | H/R (Span Height/ Airfoil Radius) [—] | $T_L/R$ (Leading Edge Thickness/ Airfoil Radius) [—] | $L_{airfoil}/R$ (Airfoil Length/ Airfoil Radius) [—] | $T_{max}/R$ (Maximum Thickness/ Airfoil Radius) [—] | $U_{tip}$ (Tip Speed) ft/sec | ATP (Airfoil Thickness Parameter) [—] |
|---|---|---|---|---|---|---|
| Ex. 1 | 0.624 | 0.005 | 0.412 | 0.012 | 1420 | 0.645 |
| Ex. 2 | 0.302 | 0.003 | 0.272 | 0.009 | 1273 | 0.336 |
| Ex. 3 | 0.246 | 0.002 | 0.189 | 0.006 | 1313 | 0.474 |
| Ex. 4 | 0.182 | 0.003 | 0.170 | 0.009 | 1267 | 0.389 |
| Ex. 5 | 0.624 | 0.005 | 0.412 | 0.012 | 1420 | 0.645 |
| Ex. 6 | 0.302 | 0.004 | 0.252 | 0.007 | 1273 | 0.719 |
| Ex. 7 | 0.246 | 0.005 | 0.199 | 0.006 | 1313 | 1.068 |
| Ex. 8 | 0.182 | 0.003 | 0.175 | 0.008 | 1267 | 0.431 |
| Ex. 9 | 0.624 | 0.006 | 0.452 | 0.012 | 1421 | 0.630 |
| Ex. 10 | 0.355 | 0.004 | 0.276 | 0.009 | 1378 | 0.663 |
| Ex. 11 | 0.241 | 0.005 | 0.188 | 0.007 | 1348 | 1.028 |
| Ex. 12 | 0.178 | 0.004 | 0.174 | 0.008 | 1309 | 0.529 |

Figure 4:
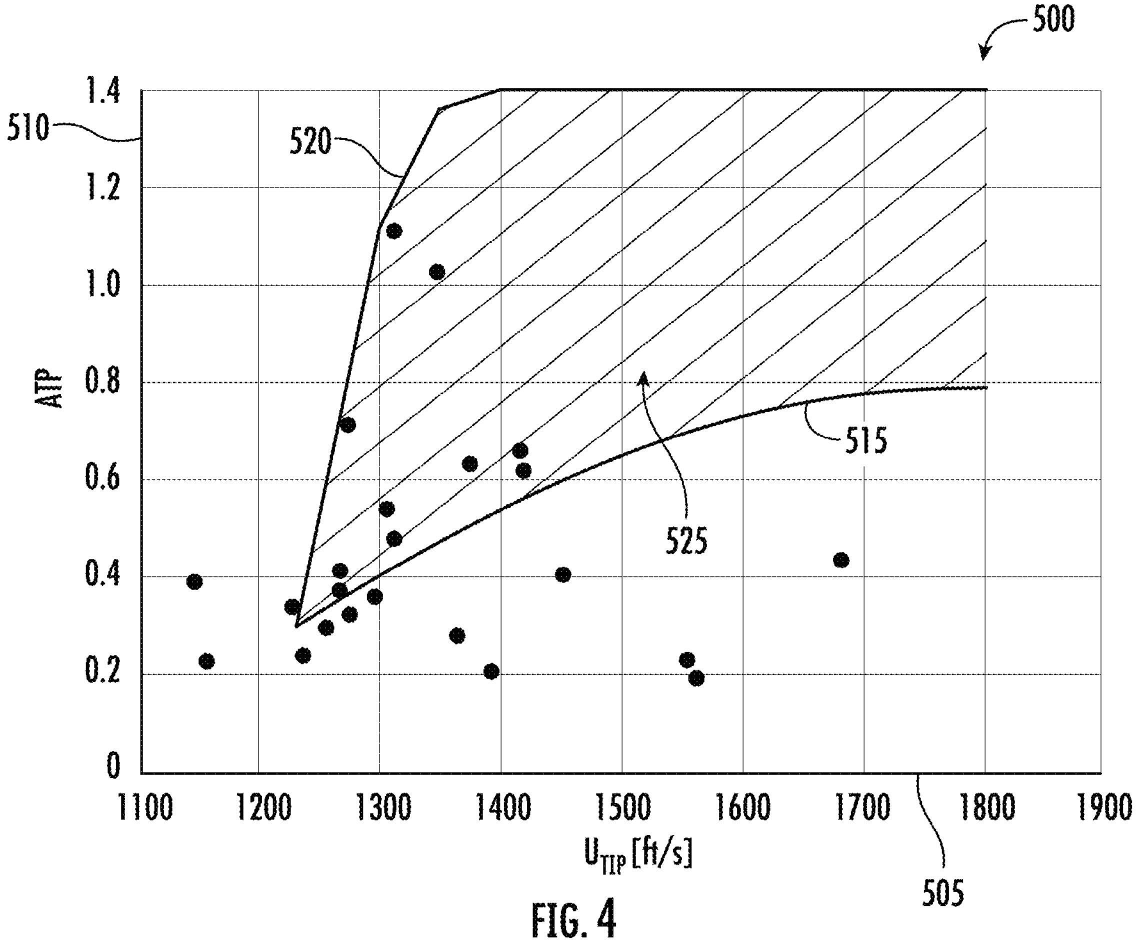
FIG. 4 is a graphical representation of an airfoil thickness parameter relative to a tip speed of a plurality of airfoils of the engine according to an exemplary embodiment of the present disclosure.

Based on the airfoil thickness parameter (ATP) values of Examples 1-12 in Table 2, it was determined that gas turbine engine and airfoil designs with an ATP value in the range of 0.3 to 1.4 (i.e., 0.3<ATP<1.4), shown in FIG. 4, advantageously meet the durability and robustness requirements while maintaining within desired tolerances and being capable of use in existing engine systems. In some embodiments, gas turbine engine and airfoil designs with an ATP value in the range of 0.336 to 1.068 (i.e., 0.336≤ATP≤1.068) advantageously meet the durability and robustness requirements.

Additionally, the inventors discovered that correlating the rotational speed at the tip of the plurality of airfoils to the maximum thickness $T_{max}$, the airfoil length $L_{airfoil}$, and the span height H balances thickness requirements of the plurality of airfoils for preventing foreign object damage without detrimentally increasing weight and reducing aerodynamic performance. Moreover, the thickness of the plurality of airfoils can be determined based on the rotational speed at the tip of the plurality of airfoils. For example, as the rotational speed at the tip (or tip speed) of the plurality of airfoils increases, the thickness of the plurality of airfoils may be increased in order to absorb greater forces as a result of the plurality of airfoils rotating at higher speeds.

Values for various airfoil thickness parameter (ATP) characteristics of an engine defined by Expressions (1)-(7) are set forth below in TABLE 3. The span height H, the leading edge thickness $T_L$, the airfoil length $L_{airfoil}$, and the maximum thickness $T_{max}$ set forth in Table 3 are normalized relative to the airfoil radius R. Accordingly, Table 3 provides values for the ratio of the span height H divided by the airfoil radius R, the ratio of the leading edge thickness $T_L$ divided by the airfoil radius R, the ratio of the airfoil length $L_{airfoil}$ divided by the airfoil radius R, and maximum thickness $T_{max}$ divided by the airfoil radius R along with values for the tip speed $U_{tip}$ and the airfoil thickness parameter (ATP).

TABLE 3

| Parameter | Description | Range | Units |
|---|---|---|---|
| ATP | Airfoil Thickness Parameter | 0.3 to 1.4, such as 0.336 to 1.068 | n/a |
| H/R | Ratio of Span Height over Airfoil Radius R | 0.178 to 0.624 | n/a |

TABLE 3-continued

| Parameter | Description | Range | Units |
|---|---|---|---|
| $T_L/R$ | Ratio of Leading Edge Thickness over Airfoil Radius R | 0.002 to 0.006 | n/a |
| $L_{airfoil}/R$ | Ratio of Airfoil Length over Airfoil Radius R | 0.170 to 0.452 | n/a |
| $T_{max}/R$ | Maximum Thickness over Airfoil Radius R | 0.006 to 0.012 | n/a |
| $U_{tip}$ | Tip speed | 1,267 to 1,800 | feet per second |

FIG. 4 provides a graph 500 depicting the airfoil thickness parameter (ATP) as a function of the tip speed $U_{tip}$. The graph 500 illustrates a range 525 corresponding to the values shown in Table 3. The graph 500 includes the data shown in Table 2 as well as additional data points that fall outside the range 525. The data points that fall within the range 525 provide a thinner airfoil capable of preventing foreign object damage and providing improved efficiency.

For example, the graph 500 provides the tip speed $U_{tip}$ on the X-axis 505 and the airfoil thickness parameter (ATP) on the Y-axis 510. As set forth above with respect to Expression (1), the airfoil thickness parameter (ATP) is defined as $$\frac{H * T_L}{L_{chord} * T_{max}}.$$

The graph 500 includes a first line 515 indicating the lower bound for the relationship between the airfoil thickness parameter (ATP) and the tip speed $U_{tip}$. For example, the first line 515 corresponds to the beta distribution set forth with respect to Expressions (3)-(4). The graph 500 includes a second line 520 indicating the upper bound for the relationship between the airfoil thickness parameter (ATP) and the tip speed $U_{tip}$. For example, the first line 515 corresponds to the beta distribution set forth with respect to Expressions (5)-(6). Moreover, the graph 500 depicts the range 525 where the tip speed $U_{tip}$ is greater than or equal to 1,267 feet per second and less than 1,800 feet per second and the airfoil thickness parameter (ATP) is greater than 0.3 and less than 1.4. For example, the airfoil thickness parameter (ATP) is greater than or equal to 0.336 and less than or equal to 1.068, as set forth above with respect to Tables 2-3.

The ranges for the airfoil thickness parameter (ATP) and the examples provided herein capture desired airfoil parameters, such as airfoil thickness, based on the tip speed of the plurality of airfoils to balance weight with aerodynamic efficiency. For example, thicker airfoils increase weight and result in efficiency and operability penalties while thinner airfoils require more durable materials that increase weight and also result in efficiency and operability penalties. Accordingly, the ranges for the airfoil thickness parameter (ATP) provided herein captures specific subsets of geometries and characteristics of the plurality of airfoils that takes into consideration various benefits and penalties of choosing one geometry or characteristic over another.

Further, the capability of the plurality of airfoils to withstand foreign object damage is a function of the rotational speed at the tip of the plurality of airfoils $U_{tip}$, the leading edge thickness $T_L$, and a slope of each of the plurality of the plurality of airfoils towards the maximum thickness, among other factors. A greater leading edge thickness $T_L$ improves tolerance of foreign object damage but reduces efficiency and operability. Therefore, it is desirable to reduce the maximum thickness $T_{max}$ of each of the plurality of airfoils while providing improved durability, robustness, and aerodynamic performance of the plurality of airfoils. Additionally, the material forming the plurality of airfoils impacts the design, durability, robustness, and performance of the plurality of airfoils. For example, while steel may allow for a thinner airfoil design compared to airfoils formed of other materials, such as titanium, a greater leading edge thickness would be required. Moreover, some materials, such as steel, are heavier than others, which requires a heavier compressor having higher inertia. Accordingly, the ranges for the span height H, the leading edge thickness $T_L$, the airfoil length $L_{airfoil}$, the maximum thickness $T_{max}$, and the rotational speed Q of the plurality of airfoils provided herein strike a balance between durability, robustness, aerodynamic efficiency, and weight.

The airfoil thickness parameter (ATP) can therefore identify a gas turbine engine with a plurality of airfoils capable of achieving a desired durability, robustness, and aerodynamic efficiency, and suited for a particular mission requirement, one that takes into account efficiency, weight, thermal capacity needs, complexity, reliability, and other factors influencing the optimal choice for a gas turbine engine with plurality of airfoils described herein.

Accordingly, the present disclosure provides a plurality of airfoils having a desired thickness for preventing foreign object damage at various tip speeds without increasing weight and decreasing aerodynamic efficiency.

Further aspects are provided by the subject matter of the following clauses:

A gas turbine engine, comprising: a turbomachine comprising a compressor section, a combustion section, and a turbine section arranged in serial flow order along a centerline axis, the compressor section comprising an airfoil, the airfoil including a leading edge, a trailing edge opposite the leading edge, a first sidewall extending between the leading edge and the trailing edge, a second sidewall extending between the leading edge and the trailing edge opposite the first sidewall, an airfoil root, and an airfoil tip opposite the airfoil root; wherein the airfoil is configured to rotate at a rotational speed (Ω) in radians per second; wherein the airfoil defines: an airfoil radius (R) in feet between the centerline axis and the airfoil tip, a span height (H) in feet between the airfoil root and the airfoil tip, a ratio of the span height (H) divided by the airfoil radius (R) is greater than or equal to 0.178 and less than or equal to 0.624, a leading edge thickness ($T_L$) in feet between the first sidewall and the second sidewall, a ratio of the leading edge thickness ($T_L$) divided by the airfoil radius (R) is greater than or equal to 0.002 and less than or equal to 0.006, an airfoil length ($L_{airfoil}$) in feet extending between the leading edge and the trailing edge, a ratio of the airfoil length ($L_{airfoil}$) divided by the airfoil radius (R) is greater than or equal to 0.170 and less than or equal to 0.452, a maximum thickness ($T_{max}$) in feet between the first sidewall and the second sidewall, a ratio of the maximum thickness ($T_{max}$) divided by the airfoil radius (R) is greater than or equal to 0.006 and less than or equal to 0.012, a tip speed ($U_{tip}$) equal to Ω×R, the tip speed ($U_{tip}$) greater than or equal to 1,267 feet/second and less than or equal to 1,800 feet/second, and an airfoil thickness parameter (ATP) determined as follows:

$$\frac{H * T_L}{L_{airfoil} * T_{max}};$$

the airfoil thickness parameter (ATP) is greater than or equal to a lower bound of 0.3 and less than or equal to an upper bound of 1.4; wherein the lower bound and the upper bound are defined by a Beta Distribution (B) based on a ratio (x), a first constant (α), and a second constant (β), the Beta Distribution defined as:

$$f(x; \alpha, \beta) = \frac{1}{B(\alpha, \beta)} x^{\alpha-1}(1-x)^{\beta-1};$$

wherein the ratio (x) is based on $U_{tip}$ and the lower bound is defined by:

$$0.79 * \left[\frac{1}{B(1.9, 2.4)}\left(\frac{U_{tip} - 910}{890}\right)^{0.9}\left(1 - \left(\frac{U_{tip} - 910}{890}\right)\right)^{1.4}\right];$$

and wherein the upper bound is defined by:

$$1.4 * \left[\frac{1}{B(18.5, 43.5)}\left(\frac{U_{tip} - 1035}{765}\right)^{17.5}\left(1 - \left(\frac{U_{tip} - 1035}{765}\right)\right)^{42.5}\right].$$

The gas turbine engine of any preceding clause, wherein the airfoil thickness parameter (ATP) is greater than equal to a lower bound of 0.336 and less than or equal to an upper bound of 1.068.

The gas turbine engine of any preceding clause, wherein the leading edge thickness ($T_L$) is measured 0.040 inches from the leading edge.

The gas turbine engine of any preceding clause, wherein the airfoil length ($L_{airfoil}$) extends parallel to the centerline axis between the leading edge and the trailing edge.

The gas turbine engine of any preceding clause, wherein the airfoil root is located at 0% of the span height (H) and the airfoil tip is located at 100% of the span height (H); and wherein the leading edge thickness ($T_L$) and maximum thickness ($T_{max}$) are measured at the airfoil tip at 100% of the span height (H).

The gas turbine engine of any preceding clause, wherein the rotational speed (Ω) and the tip speed ($U_{tip}$) are measured when the gas turbine engine is operating at a redline speed.

The gas turbine engine of any preceding clause, wherein the tip speed ($U_{tip}$) is greater than or equal to 1,267 feet/second and less than or equal to 1,421 feet/second.

The gas turbine engine of any preceding clause, wherein the gas turbine engine comprises a turboprop engine.

The gas turbine engine of any preceding clause, wherein: the turbine section comprises a drive turbine; the turbomachine further comprising a drive turbine shaft coupled to the drive turbine; and the gas turbine engine further comprises a propeller section, the propeller section comprising a propeller driven by the drive turbine shaft.

The gas turbine engine of any preceding clause, wherein the gas turbine engine comprises a turboshaft engine.

The gas turbine engine of any preceding clause, wherein the gas turbine engine comprises a turbofan engine.

The gas turbine engine of any preceding clause, wherein the airfoil is formed of titanium.

The gas turbine engine of any preceding clause, wherein the compressor section comprises a booster compressor and a high pressure (HP) compressor downstream of the booster compressor.

The gas turbine engine of any preceding clause, further comprising a plurality of airfoils including the airfoil.

The gas turbine engine of any preceding clause, wherein the plurality of airfoils comprise a plurality of rotor blades configured to rotate about the centerline axis.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine, comprising:

a turbomachine comprising a compressor section, a combustion section, and a turbine section arranged in serial flow order along a centerline axis, the compressor section comprising an airfoil, the airfoil including a leading edge, a trailing edge opposite the leading edge, a first sidewall extending between the leading edge and the trailing edge, a second sidewall extending between the leading edge and the trailing edge opposite the first sidewall, an airfoil root, and an airfoil tip opposite the airfoil root;

wherein the airfoil is configured to rotate at a rotational speed (Ω) in radians per second;

wherein the airfoil defines:

an airfoil radius (R) in feet between the centerline axis and the airfoil tip, a span height (H) in feet between the airfoil root and the airfoil tip, a ratio of the span height (H) divided by the airfoil radius (R) is greater than or equal to 0.178 and less than or equal to 0.624, a leading edge thickness ($T_L$) in feet between the first sidewall and the second sidewall, a ratio of the leading edge thickness ($T_L$) divided by the airfoil radius (R) is greater than or equal to 0.002 and less than or equal to 0.006, an airfoil length ($L_{airfoil}$) in feet extending between the leading edge and the trailing edge, a ratio of the airfoil length ($L_{airfoil}$) divided by the airfoil radius (R) is greater than or equal to 0.170 and less than or equal to 0.452, a maximum thickness ($T_{max}$) in feet between the first sidewall and the second sidewall, a ratio of the maximum thickness ($T_{max}$) divided by the airfoil radius (R) is greater than or equal to 0.006 and less than or equal to 0.012, a tip speed ($U_{tip}$) equal to Ω×R, the tip speed ($U_{tip}$) greater than or equal to 1,267 feet/second and less than or equal to 1,800 feet/second, and an airfoil thickness parameter (ATP) determined as follows:

$$\frac{H * T_L}{L_{airfoil} * T_{max}};$$

wherein the airfoil thickness parameter (ATP) is greater than or equal to a lower bound of 0.3 and less than or equal to an upper bound of 1.4;

wherein the lower bound and the upper bound are defined by a Beta Distribution (B) based on a ratio (x), a first constant (α), and a second constant (β), the Beta Distribution defined as:

$$f(x;\alpha,\beta)=\frac{1}{B(\alpha,\beta)}x^{\alpha-1}(1-x)^{\beta-1};$$

wherein the ratio (x) is based on the tip speed ($U_{tip}$) and the lower bound is defined by:

$$0.79*\left[\frac{1}{B(1.9,2.4)}\left(\frac{U_{tip}-910}{890}\right)^{0.9}\left(1-\left(\frac{U_{tip}-910}{890}\right)\right)^{1.4}\right];$$

and wherein the upper bound is defined by:

$$1.4*\left[\frac{1}{B(18.5,43.5)}\left(\frac{U_{tip}-1035}{765}\right)^{17.5}\left(1-\left(\frac{U_{tip}-1035}{765}\right)\right)^{42.5}\right].$$

2. The gas turbine engine of claim 1, wherein the airfoil thickness parameter (ATP) is greater than or equal to a lower bound of 0.336 and less than or equal to an upper bound of 1.068.

3. The gas turbine engine of claim 1, wherein the leading edge thickness ($T_L$) is measured 0.040 inches from the leading edge.

4. The gas turbine engine of claim 1, wherein the airfoil length ($L_{airfoil}$) extends parallel to the centerline axis between the leading edge and the trailing edge.

5. The gas turbine engine of claim 1, wherein the airfoil root is located at 0% of the span height (H) and the airfoil tip is located at 100% of the span height (H); and wherein the leading edge thickness ($T_L$) and maximum thickness ($T_{max}$) are measured at the airfoil tip at 100% of the span height (H).

6. The gas turbine engine of claim 1, wherein the rotational speed (Ω) and the tip speed ($U_{tip}$) are measured when the gas turbine engine is operating at a redline speed.

7. The gas turbine engine of claim 1, wherein the tip speed ($U_{tip}$) is greater than or equal to 1,267 feet/second and less than or equal to 1,421 feet/second.

8. The gas turbine engine of claim 1, wherein the gas turbine engine comprises a turboprop engine.

9. The gas turbine engine of claim 8, wherein:

the turbine section comprises a drive turbine;

the turbomachine further comprising a drive turbine shaft coupled to the drive turbine; and the gas turbine engine further comprises a propeller section, the propeller section comprising a propeller driven by the drive turbine shaft.

10. The gas turbine engine of claim 1, wherein the gas turbine engine comprises a turboshaft engine.

11. The gas turbine engine of claim 1, wherein the gas turbine engine comprises a turbofan engine.

12. The gas turbine engine of claim 1, wherein the airfoil is formed of titanium.

13. The gas turbine engine of claim 1, wherein the compressor section comprises a booster compressor and a high pressure (HP) compressor downstream of the booster compressor.

14. The gas turbine engine of claim 1, further comprising a plurality of airfoils including the airfoil.

15. The gas turbine engine of claim 14, wherein the plurality of airfoils comprise a plurality of rotor blades configured to rotate about the centerline axis.

* * * * *